(12) United States Patent
Watson et al.

(10) Patent No.: US 7,406,166 B1
(45) Date of Patent: Jul. 29, 2008

(54) MESSAGE CONVERSION SYSTEM

(75) Inventors: Thomas Michael Watson, Raymore, MO (US); John Michael Gatewood, Lees Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 885 days.

(21) Appl. No.: 10/773,066

(22) Filed: Feb. 5, 2004

(51) Int. Cl.
*H04M 7/00* (2006.01)
(52) U.S. Cl. .................. 379/229; 379/15.04; 379/230; 379/220.01; 379/221.08; 379/221.09; 379/221.1; 379/221.11
(58) Field of Classification Search .............. 379/15.04, 379/229, 230, 220.01, 221.08–221.11
See application file for complete search history.

(56) References Cited

U.S. PATENT DOCUMENTS

| | | | |
|---|---|---|---|
| 5,991,391 A * | 11/1999 | Miloslavsky | 379/265.11 |
| 6,570,963 B1 | 5/2003 | Watson et al. | |
| 6,683,937 B1 | 1/2004 | Watson et al. | |
| 6,724,886 B1 | 4/2004 | Watson | |
| 6,766,009 B2 * | 7/2004 | Williams et al. | 379/229 |
| 6,785,362 B1 * | 8/2004 | Van Der Gouwe | 379/9.01 |
| 2003/0198218 A1 * | 10/2003 | Farris et al. | 370/356 |

* cited by examiner

*Primary Examiner*—Quynh H Nguyen

(57) ABSTRACT

A message conversion system comprising a first interface configured to receive a call signaling message for a call in a first format wherein the call signaling message includes a plurality of call information elements, a processing system configured to copy the plurality of call information elements from the call signaling message, insert a first group of the plurality of call information elements into a first group of a plurality of fields of a setup message, and insert a second group of the plurality of call information elements into a second group of the plurality of fields of the setup message, and a second interface configured to transmit the setup message.

21 Claims, 9 Drawing Sheets

| byte | bit | | | | | | | |
|---|---|---|---|---|---|---|---|---|
| | 8 | 7 | 6 | 5 | 4 | 3 | 2 | 1 |
| 1 | Length of User-User contents (n) | | | | | | | |
| 2 | Protocol Discriminator | | | | | | | |
| 3 | Mask with 0's | | | | | | | Privacy Bit |
| 4-19 | Charge Number digits | | | | | | | |
| 20 | OLI | | | | | | | |
| 21-n | User to User Information bytes from ISUP message if present in ISUP message | | | | | | | |

| | 8 | 7 | 6 | 5 | 4 | 3 | 2 | 1 |
|---|---|---|---|---|---|---|---|---|
| 1 | Odd/Even | Nature of Address Indicator | | | | | | |
| 2 | Spare | Numbering Plan | | | Caller ID Presentation 00=allowed, 01=not allowed | | spare | |
| 3 | Calling Number Digit 1 | Not Used | | | Calling Number Digit 0 | | | |
| 4 | Calling Number Digit 3 | Not Used | | | Calling Number Digit 2 | | | |
| 5 | Calling Number Digit 5 | Not Used | | | Calling Number Digit 4 | | | |
| 6 | Calling Number Digit 7 | Not Used | | | Calling Number Digit 6 | | | |
| 7 | Calling Number Digit 9 | Not Used | | | Calling Number Digit 8 | | | |
| 8 | | Not Used | | | | | | |
| 9 | | Not Used | | | | | | |
| 10 | | Not Used | | | | | | |
| 11 | | Not Used | | | | | | |
| 12 | | Not Used | | | | | | |

FIG. 8

MESSAGE CONVERSION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to telecommunication relay service (TRS) systems, and in particular, to message conversion systems and methods.

2. Description of the Prior Art

Various federal and state laws and regulations require telecommunication carriers to provide services by which deaf customers can communicate with other deaf and hearing customers. The telecommunication carriers developed telecom relay services (TRS) in conjunction with telecommunication equipment vendors to link deaf customers to the other deaf and hearing customers. One particular TRS solution offered a TRS platform designed as a variation of the already established Operator Services platform, utilizing the Rockwell Galaxy to provide automatic call distributor (ACD) functions.

Rockwell designed the Galaxy in the 1970's and did not predict the need to incorporate the Galaxy into the TRS platform. Over the years, various deployments of the TRS platform have included new features and pushed the basic architecture well past its expected useful life. Rockwell has since discontinued the core Galaxy ACD and no longer produces spare parts. Additionally, the Rockwell Galaxy based TRS architecture does not meet recent federal and contractual technology requirements. The Federal Communications Commission (FCC) has mandated three new services beyond current capabilities given the present technology of the TRS platform: SS7 for Caller-ID, Video Relay Services, and Internet Relay.

Video Relay requires the capability of ISDN to the desktop or conversion of inbound H.320, video protocols to H.323 and using TCP/IP to transport the video stream to the agent. Providing SS7 signaling for advanced call information processing requires using SS7 protocol signaling. Internet Relay requires the addition of TCP/IP within a relay center to replace NetBIOS protocols, and a Gateway Server to communicate with relay center subsystems to determine next available agents (i.e., the Rockwell ACD). Current TRS solutions such as the Rockwell Galaxy fall short of supporting the newly required and anticipated services.

SUMMARY OF THE INVENTION

An embodiment of the invention includes a message conversion system comprising a first interface configured to receive a call signaling message for a call in a first format wherein the call signaling message includes a plurality of call information elements, a processing system configured to copy the plurality of call information elements from the call signaling message, insert a first group of the plurality of call information elements into a first group of a plurality of fields of a setup message, and insert a second group of the plurality of call information elements into a second group of the plurality of fields of the setup message, and a second interface configured to transmit the setup message.

In some embodiments of the invention, the call signaling message in the first format comprises an initial address message (IAM) of the signaling system seven (SS7) signaling protocol.

In some embodiments of the invention, the second group of the plurality of fields of the setup message comprises a remaining group of the plurality of fields of the setup message.

In some embodiments of the invention, the remaining group comprises a User-User field of an IDSN setup message.

In some embodiments of the invention, the plurality of call information elements comprise a charge number element, an originating line information (OLI) element, and a privacy bytes element.

Some embodiments of the invention include inserting the charge number element, the OLI element, and the privacy bytes element into the User-User field of the ISDN setup message.

In some embodiments of the invention, a one of the plurality of call information elements comprises a calling party number.

In some embodiments of the invention, a one of the plurality of call information elements comprises a dialed number.

In some embodiments of the invention, the call comprises an incoming leg of the call over a feature group D connection.

In some embodiments of the invention, the call comprises an outgoing leg of the call over an integrated services digital network (ISDN) connection.

BRIEF DESCRIPTION OF THE DRAWINGS

The same reference number represents the same element on all drawings.

FIG. 7 illustrates a format of a user-user information element in an embodiment of the invention.

FIG. 8 illustrates a format of a calling party number information element in an embodiment of the invention.

DETAILED DESCRIPTION OF THE PREFERRED EMBODIMENT

FIGS. 1-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 1-2

Figure 1:
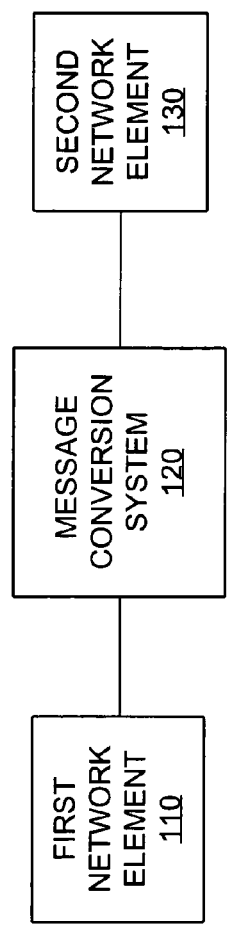
FIG. 1 illustrates a communication system in an embodiment of the invention.

FIG. 1 illustrates communication system 100 in an embodiment of the invention. Communication system 100 includes first network element 110, message conversion system 120, and second network element 130. First network element 110 is in communication with message conversion system 120 over a first communication link. First network element 110 could comprise a telecommunications switch. The first communication link could comprise a time division multiplexed (TDM) link of a first variety whereby call signaling is directed over the link to message conversion system 120. First network element 110 and message conversion system 120 interchange signaling messages in a first signaling protocol. Second network element 130 is in communication with message conversion system 120 over a second communication link. Second network element 130 could comprise a call processing system such as call center equipment. The second communication link could comprise a TDM link of a second variety. Message conversion system 120 interchanges signaling messages including setup messages with second network element 130.

Figure 2:
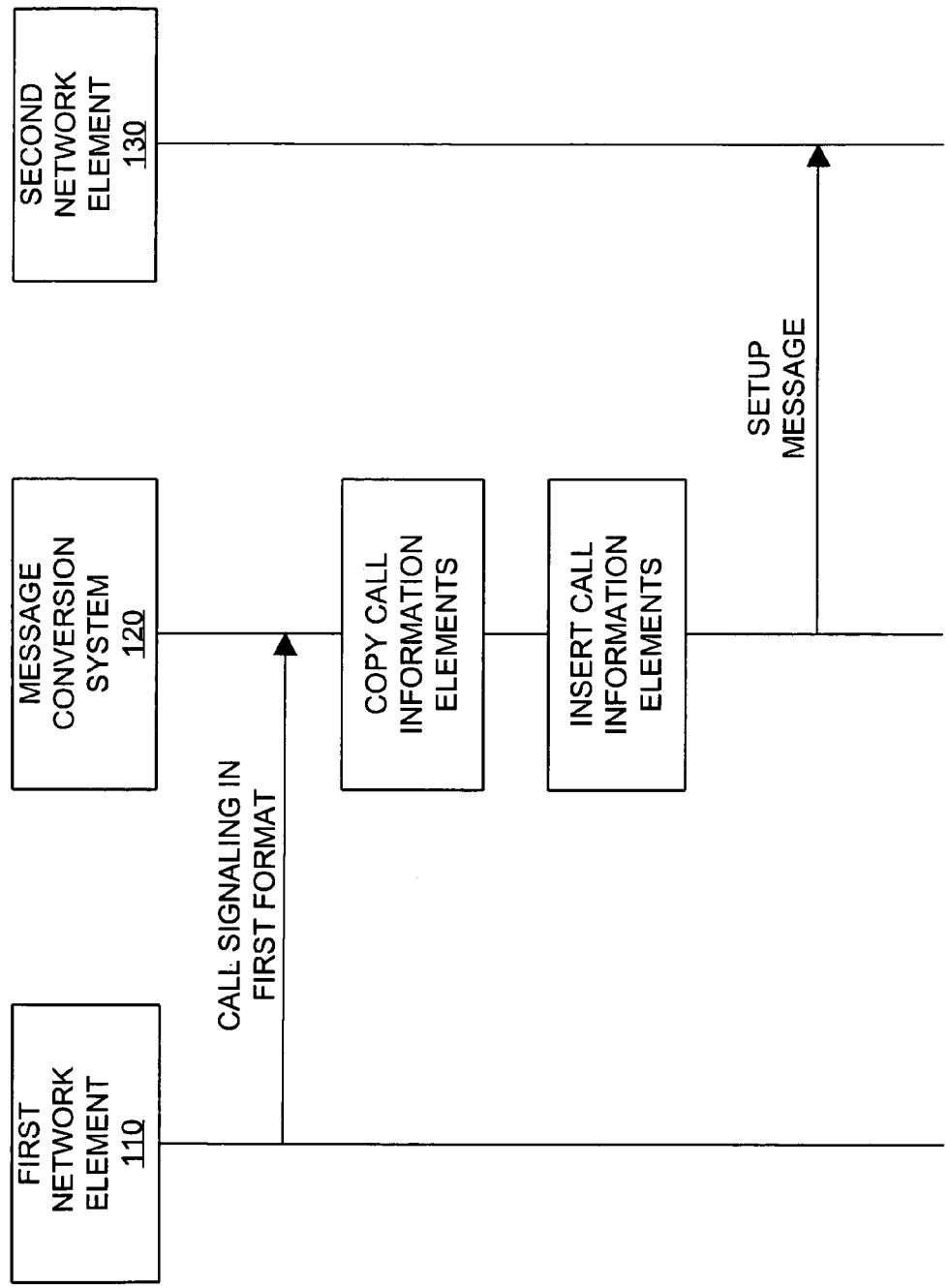
FIG. 2 illustrates the operation of a communication system in an embodiment of the invention.

FIG. 2 illustrates the operation of communication system 100 in an embodiment of the invention. First network element 110 transmits call signaling in a first protocol to message conversion system 120. The call signaling includes a call signaling message. Message conversion system 120 receives the call signaling message into a first interface wherein the call signaling message includes a plurality of call information elements. Message conversion system 120 copies the call information elements and inserts a first group of the call information elements into a first group of a plurality of fields of a setup message. Next, message conversion system 120 inserts a second group of the call information elements into a second group of the plurality of fields of the setup message. Message conversion system 120 transmits the setup message from a second interface to second network element 130.

Figure 3:
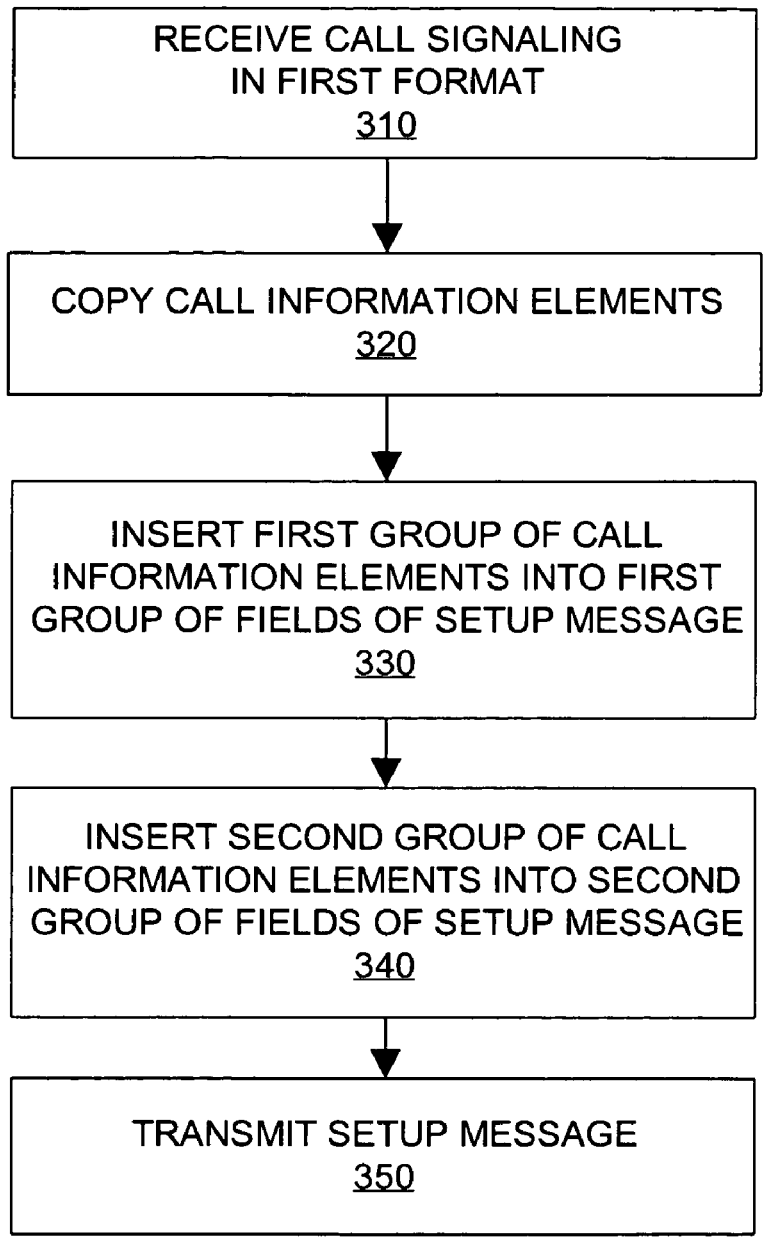
FIG. 3 illustrates the operation of a message conversion system in an embodiment of the invention.

FIG. 3 illustrates the operation of message conversion system 120 in an embodiment of the invention. Message conversion system 120 receives a call signaling message for a call in a first format into a first interface wherein the call signaling message includes a plurality of call information elements (Step 310). Message conversion system 120 copies the plurality of call information elements from the call signaling message (Step 320) and inserts a first group of the call information elements into a first group of a plurality of fields of a setup message (Step 330). Next, message conversion system 120 inserts a second group of the call information elements into a second group of the plurality of fields of the setup message (Step 340). Message conversion system 120 then transmits the setup message from a second interface (Step 350) to second network element 130.

Second Embodiment Configuration and Operation

FIGS. 4-6

Figure 4:
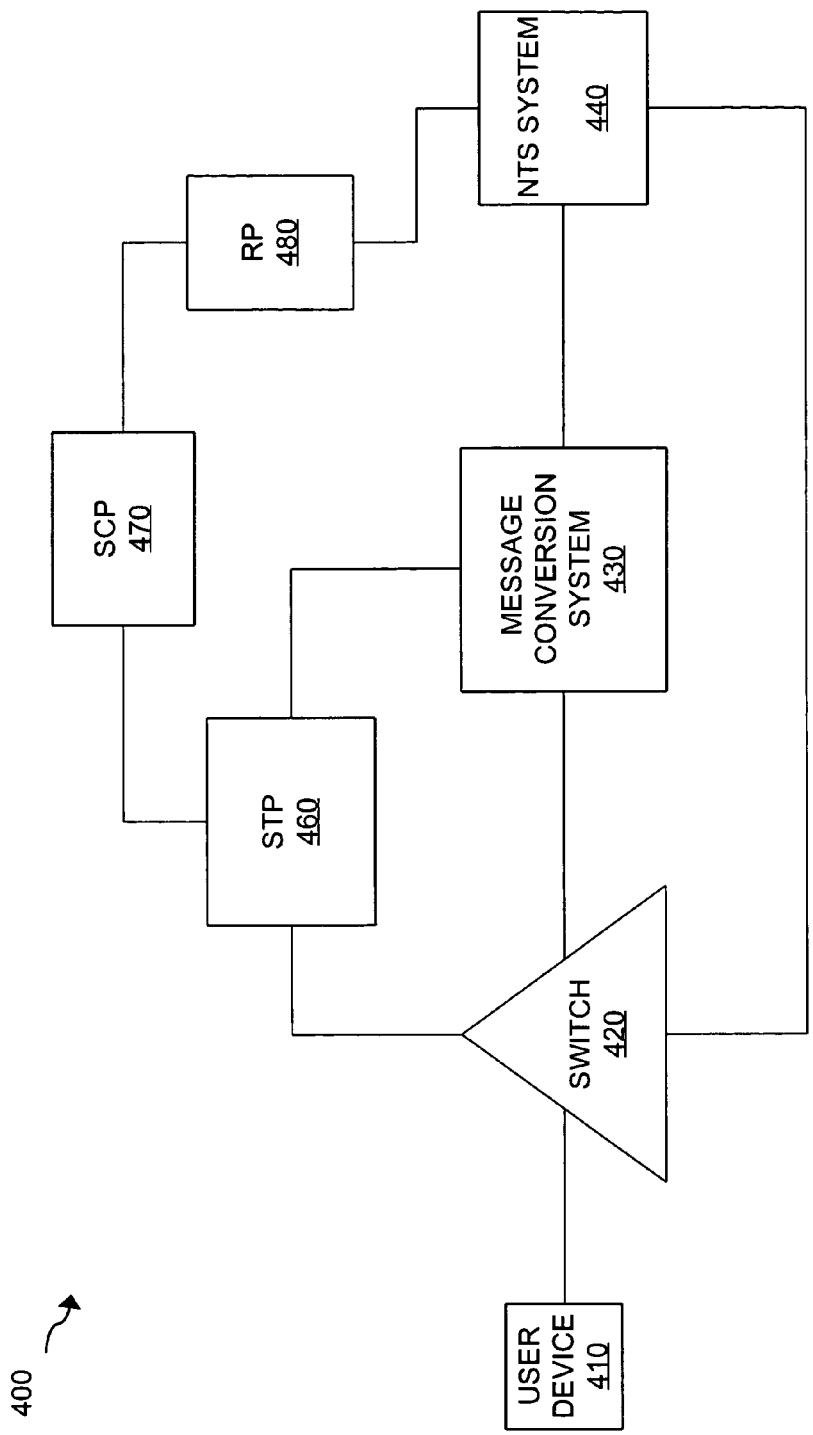
FIG. 4 illustrates a telecommunications relay service (TRS) system in an embodiment of the invention.

FIG. 4 illustrates telecommunications relay service (TRS) system 400 in an embodiment of the invention. TRS system 400 includes user device 410, switch 420, message conversion system 430, networked telephony service (NTS) system 440, signal transfer point (STP) 460, service control point (SCP) 470, and remote processor (RP) 480. Switch 420 comprises a DSM-250 switch. Message conversion system 430 comprises an Encore SP230 conversion system. Switch 420 is connected to message conversion system 430 and NTS system 440. RP 480 is connected to NTS system 440 and SCP 470. STP 460 is connected to message conversion system 430 and switch 420.

Switch 420 connects with message conversion system 430 over conventional time division multiplexed (TDM) circuits such as a T-1 circuit. System 430 then connects to NTS system 440 over conventional TDM circuits using ISDN connections. STP 460 interchanges signaling between switch 420, SCP 470, and message conversion system 430 by signaling system 7 (SS7) signaling. NTS system 440 connects directly to switch 420 over conventional TDM circuits using Integrated Services Digital Network (ISDN) connections, Ultra Watts, or a virtual private network (VPN).

Figure 5:
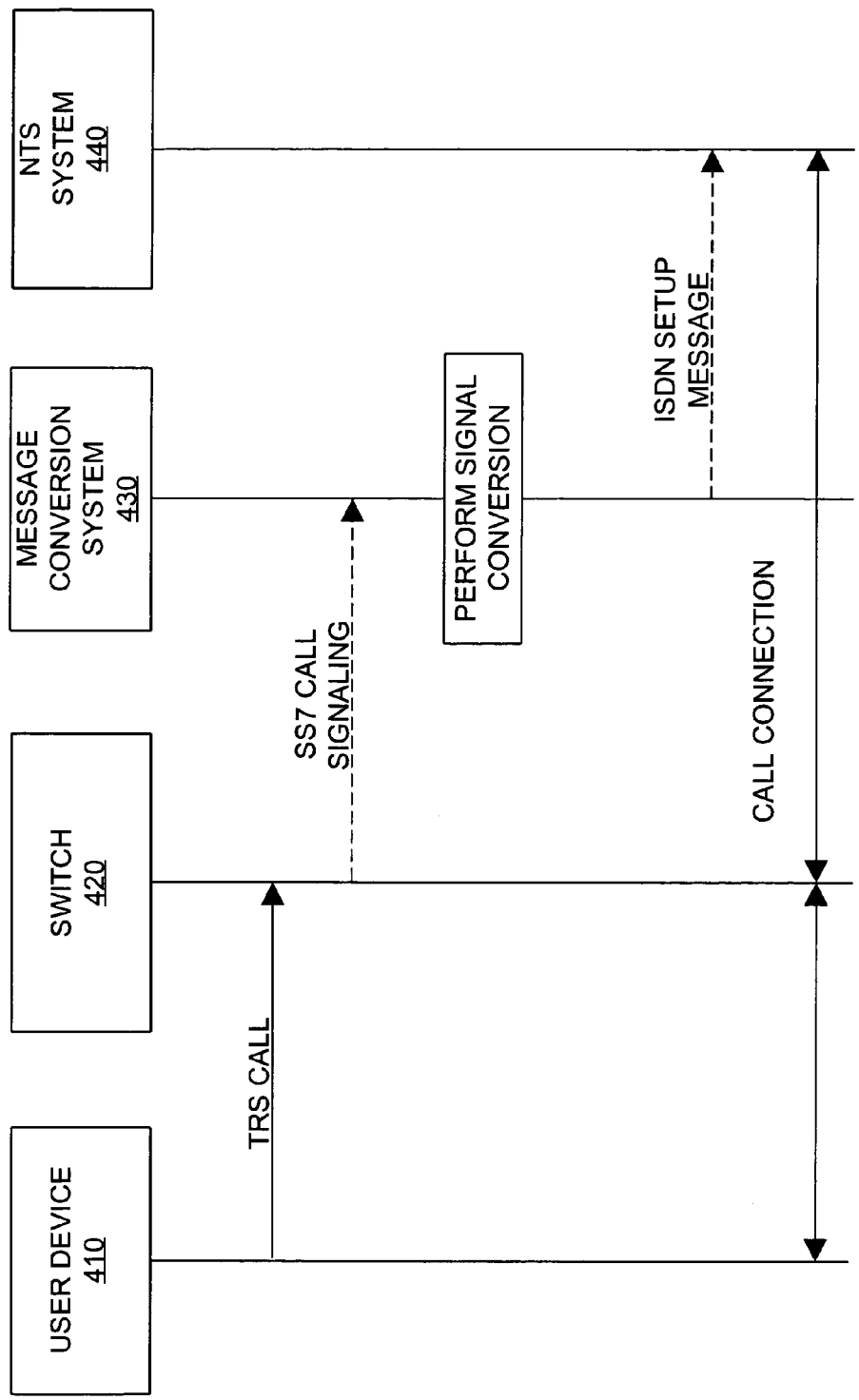
FIG. 5 illustrates the operation of a telecommunications relay service (TRS) system in an embodiment of the invention.

FIG. 5 illustrates operation of TRS system 400 in an embodiment of the invention. A caller desires to places a call to TRS system 400 and dials an 800 number utilizing user device 410. User device 410 could comprise a conventional telephone, a cell phone, personal digital assistant (PDA) or any other type of calling device. User device 410 transmits the dialed number to switch 420. Other intermediary devices could be located between user device 410 and switch 420, such as a cell tower or public branch exchange (PBX) but are not depicted for purposes of simplicity.

The dialed 800 number arrives at switch 420. Switch 420 accesses SCP 470 through STP 460 to determine routing instructions for the call. In accordance with the routing instructions, switch 420 routes the call to NTS system 440. Switch 420 passes SS7 signaling for the call to message conversion system 430 wherein the SS7 signaling includes several call information elements. Message conversion system 430 receives the SS7 signaling and converts the SS7 signaling to an ISDN format. Message conversion system 430 then transfers an ISDN setup message to NTS system 440 wherein the ISDN setup message contains the call information elements from the SS7 signaling.

Figure 6:
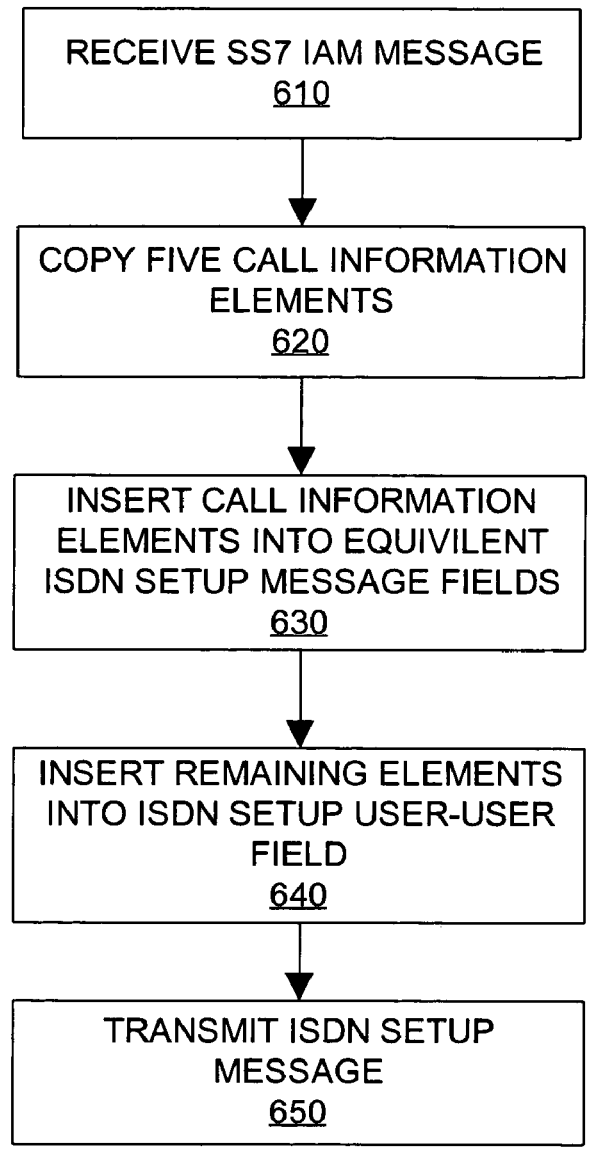
FIG. 6 illustrates the operation of a message conversion system in an embodiment of the invention.

FIG. 6 illustrates the operation of message conversion system 430 in an embodiment of the invention. Message conversion system 430 receives an SS7 Initial Address Message (IAM) from switch 420 (Step 610). The IAM includes five elements: the calling party number, called party number, originating line information (OLI), privacy byte element, and charge number. Message conversion system 430 copies the five elements (Step 620) and inserts the calling party number and called party number into equivalent fields in an ISDN setup message (Step 630). Message conversion system 430 inserts the remaining three elements (OLI, privacy byte, and charge number) into the User-User field of the ISDN setup message (Step 640). Message conversion system 430 then transmits the ISDN setup message to NTS system 440. When the ISDN setup message arrives at NTS system 440, the ISDN setup message is parsed and the five call information elements extracted by a T-1 interface card and passed on for call processing.

Third Embodiment Configuration and Operation

FIG. 7

FIG. 7 illustrates the format of the User-User information element in an embodiment of the invention. In this embodiment, ANSI SS7 to ANSI ISDN conversion allows for the Called Party Number and the Calling Party Number from the IAM on the ISUP side to pass through to the ISDN Setup message. In order to allow the other fields to be mapped onto the User-User information element a specific number of bytes for each element must be set aside in the User-User information element. The third byte will have the privacy bit in the least significant bit (LSB). The other bits are set to 0s. Bytes 4 to 19 will have the charge party number digits in ASCII format. Only the digits will be in ASCII format. The rest of the bytes will be non-ASCII 0s. The 20th byte will contain the OLI information. If the ANSI ISUP IAM has the user-to-user information parameter, the contents of that parameter will be appended to the end of the user-user element i.e., bytes 21 to n (where n is the sum of 20 and the number of bytes in the user-to-user information in the IAM).

In the Encore SP230, the above user-user information format is user configurable. In order to have the user-user information element with the above information the following command is entered into the SP230 via the maintenance interface.

user> config cc useruserinfo

Do you want to add the user-user element with information from the calling party number, charge number and original called number (y/n, current=n): y user>

By default the value is set to 'n' for no. The value will have to changed to 'y'.

The ISUP (ISDN User Part) IAM (Initial Address Message) contains three sections, the Mandatory Fixed Part, the Mandatory Variable Part, and the Optional Part. The Fixed Part is used to route a call. The Mandatory Variable Part contains the call information (Called Party Number, Calling Party Number and the Caller-ID Presentation byte, Carrier Identification, and Charge Number). The Optional Part contains the Originating Line Information (a.k.a. Information Digits) and call redirection information. The format of the Calling Party Number includes the Caller-ID Presentation bytes.

FIG. 8 depicts the twelve octets of the Calling Party Number parameter. The same parameter format, minus the Presentation bytes, is also used for the Called Party Number and the Charge (Billing) Number. The Originating Line Information is a single octet located in the Optional Part of the IAM message. The Calling Party Number and Called Party Number have standard locations in the ISDN Setup message. The remaining three, OLI, Privacy Byte and Charge Number will be placed in the ISDN Setup User-User field.

The SS7 data is passed to the NTS system by a Pulse-Encore SP230 Signal Converter that changes the FG-D w/SS7 call to an ISDN call. SS7 is required for Caller-ID blocking, Information Digits used for TRS Alternate Billing detection, Calling Party Number, Called Party Number, and Charge Number to identify the billing number for Cell and PCS phones. The above information is made available within the ISDN Setup message and is accessible to the NTS system via the ISDN D-Channel. Feature Group D with SS7 provides for Carrier-of-Choice calls. Necessary call information is passed via ISDN to the Encore SP230. The voice path connects directly to the LEC access tandem switch. The SS7 path uses existing connectivity between a long distance carrier's SS7 network and the SS7 network of the LECs owning the access tandem switch.

Inbound Call Example

A typical inbound TRS call process in an embodiment of the invention follows. A deaf caller using a Baudot TTY dials an 800 number and the call arrives at a DMS-250. The DMS-250 executes an SCP dip to retrieve routing instructions for the dialed 800 number. The DMS-250 routes the call to a Pulse-Encore SP230 Signal Converter. The converter receives the call via a Feature Group D with SS7 and passes it to an NTS system via an ISDN circuit. Five call information elements are extracted from the SS7 IAM message and inserted into an ISDN Setup message and transmitted to the NTS system.

When an inbound call arrives, the NTS system retrieves the inbound call information from the ISDN D-Channel Setup message. Using the Calling Party Number in the inbound call information, an Intelligent Call Routing Service (ICRS) running on a remote processor (RP) retrieves the caller's Preferred Routing information including a preferred connection mode such as voice, TTY, or ASCII. The NTS system will connect with ASCII calls at the highest baud rate that can be negotiated. The NTS system will send the caller's inbound call information including Calling Party Number and Called Party Number (if available) information to the Intelligent Call Routing Service (ICRS). A Skills Based Routing Server (SBR-S) will retrieve the caller's Preferred Routing information and the select the most appropriate agent based on the combined information.

The NTS system will instruct a Telephony Server to make a peer-to-peer connection between the inbound call Telephony port and the selected agent position. The inbound call information (Called Party Number, Calling Party Number, Charge Number, OLI, Caller-ID Presentation bit, and Call Arrival time) as well as the ETurboCode RIB (if available) will be sent to the selected agent position. The Agent workstation (JRelay) sees the inbound call and sets up the workstation to receive either a text or VoIP connection to the NTS system as indicated by the information provided by the NTS system. Using the inbound call information, JRelay completes the workstation application setup, issues a greeting to the caller, and retrieves the Caller's profile from a Customer Profile Database. The last act of call setup is to create a call detail record (CDR) and populate the basic call fields in the CDR.

Computer System Configuration

FIG. 9

Figure 9:
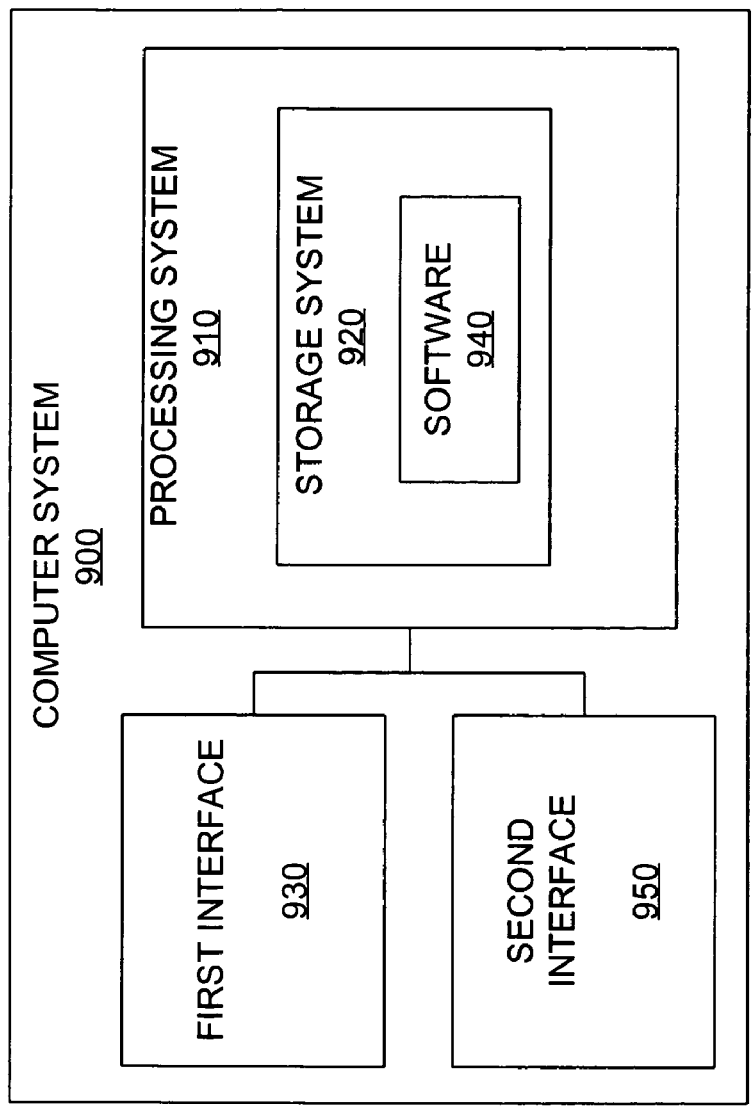
FIG. 9 illustrates a computer system in an embodiment of the invention.

FIG. 9 illustrates computer system 900 that could be used to implement aspects of the invention. In particular, computer system 900 could be used in communication system 100, TRS system 400, message conversion systems 120 and 430, and in other similar communication systems. Computer system 900 includes processing system 910, storage system 920, software 940, first interface 930, and second interface 950. Storage system 920 stores software 940. Processing system 910 is linked to first interface 930 and second interface 950. Computer system 900 could be comprised of programmed general-purpose computers, although those skilled in the art will appreciate that programmable or special purpose circuitry and equipment may be used. Computer system 900 may use a client server architecture where operations are distributed among a server system and client devices that together comprise elements 910-950.

First interface 930 could comprise a network interface card, modem, port, or some other communication device. First interface 930 may be distributed among multiple communication devices. Processing system 910 could comprise a computer microprocessor, logic circuit, or some other processing device. Processing system 910 may be distributed among multiple processing devices. Second interface 950 could comprise a keyboard, mouse, voice recognition interface, microphone and speakers, graphical display, touch screen, or some other type of user device. Storage system 920 could comprise a disk, tape, integrated circuit, server, or some other memory device. Storage system 920 may be distributed among multiple memory devices.

Processing system 910 retrieves and executes software 940 from storage system 920. Software 940 may comprise an operating system, utilities, drivers, networking software, and other software typically loaded onto a general-purpose computer. Software 940 could also comprise an application program, firmware, or some other form of machine-readable processing instructions. When executed by the processing system 910, software 940 directs the processing system 910 to operate as described for communication system 100, TRS system 400, and message conversion systems 120 and 430.

What is claimed is:

1. A method of operating a message conversion system, the method comprising:
   receiving a call signaling message for a call in a first format into a first interface wherein the call signaling message includes a plurality of call information elements;
   copying the plurality of call information elements from the call signaling message;
   inserting a first group of the plurality of call information elements into a first group of a plurality of fields of a setup message wherein the first group of the plurality of call information elements correspond to the first group of the plurality of fields of the setup message;
   inserting a second group of the plurality of call information elements into a second group of the plurality of fields of the setup message wherein the second group of the plurality of call information elements do not correspond to the second group of the plurality of fields of the setup message; and
   transmitting the setup message from a second interface.

2. The method of claim 1 wherein the call signaling message in the first format comprises an initial address message (IAM) of the signaling system seven (SS7) signaling protocol.

3. The method of claim 2 wherein the setup message comprises an integrated services digital network (ISDN) setup message.

4. The method of claim 1 wherein the second group of the plurality of fields of the setup message comprises a remaining field of the plurality of fields of the setup message.

5. The method of claim 4 wherein the remaining field comprises a user-user field of an IDSN setup message.

6. The method of claim 5 wherein the plurality of call information elements comprise a charge number element, an originating line information (OLI) element, and a privacy bytes element.

7. The method of claim 6 comprising inserting the charge number element, the OLI element, and the privacy bytes element into the user-user field of the ISDN setup message.

8. The method of claim 1 wherein a one of the plurality of call information elements comprises a calling party number.

9. The method of claim 1 further comprising receiving the call over a feature group D connection.

10. The method of claim 1 further comprising extending the call over an integrated services digital network (ISDN) connection.

11. A message conversion system comprising:
   a first interface configured to receive a call signaling message for a call in a first format wherein the call signaling message includes a plurality of call information elements;
   a processing system configured to copy the plurality of call information elements from the call signaling message, insert a first group of the plurality of call information elements into a first group of a plurality of fields of a setup message wherein the first group of the plurality of call information elements corresponds to the first group of the plurality of fields of the setup message, and insert a second group of the plurality of call information elements into a second group of the plurality of fields of the setup message wherein the second group of the plurality of call information elements does not correspond to the second group of the plurality of fields of the setup message; and
   a second interface configured to transmit the setup message.

12. The message conversion system of claim 11 wherein the call signaling message in the first format comprises an initial address message (IAM) of the signaling system seven (SS7) signaling protocol.

13. The message conversion system of claim 12 wherein the second group of the plurality of fields of the setup message comprises a remaining group of the plurality of fields of the setup message.

14. The message conversion system of claim 13 wherein the remaining group comprises a user-user field of an IDSN setup message.

15. The message conversion system of claim 14 wherein the plurality of call information elements comprise a charge number element, an originating line information (OLI) element, and a privacy bytes element.

16. The message conversion system of claim 15 wherein the processing system is configured to insert the charge number element, the OLI element, and the privacy bytes element into the user-user field of the ISDN setup message.

17. The message conversion system of claim 11 wherein a one of the plurality of call information elements comprises a calling party number.

18. The message conversion system of claim 11 wherein a one of the plurality of call information elements comprises a dialed number.

19. The message conversion system of claim 11 wherein the call comprises an incoming leg of the call over a feature group D connection.

20. The message conversion system of claim 11 wherein the call comprises an outgoing leg of the call over an integrated services digital network (ISDN) connection.

21. A computer-readable medium having instructions stored thereon for operating a processing system, wherein the instructions, when executed by the processing system, direct the processing system to:
   receive a call signaling message for a call in a first format wherein the call signaling message includes a plurality of call information elements, copy the plurality of call information elements from the call signaling message, insert a first group of the plurality of call information elements into a first group of a plurality of fields of a setup message wherein the first group of the plurality of call information elements corresponds to the first group of the plurality of fields of the setup message, insert a second group of the plurality of call information elements into a second group of the plurality of fields of the setup message wherein the second group of the plurality of call information elements does not correspond to the second group of the plurality of fields of the setup message, and transmit the setup message.

* * * * *